United States Patent [19]
Guardiani et al.

[11] Patent Number: 5,674,057
[45] Date of Patent: Oct. 7, 1997

[54] SUBMERSIBLE CANNED MOTOR MIXER PUMP

[75] Inventors: Richard F. Guardiani, Ohio Township; Richard D. Pollick, Sarver, both of Pa.

[73] Assignee: Westinghouse Electric Corporation, Pittsburgh, Pa.

[21] Appl. No.: 398,412

[22] Filed: Mar. 3, 1995

[51] Int. Cl.⁶ .................................................. F04B 35/04
[52] U.S. Cl. .................... 417/423.3; 417/423.8; 417/423.9; 417/423.12; 417/424.1; 366/264
[58] Field of Search ........................ 366/263, 264; 417/423.3, 423.8, 423.9, 423.12, 423.15, 423.14, 424.1

[56] References Cited

U.S. PATENT DOCUMENTS

| | | | |
|---|---|---|---|
| 2,568,548 | 9/1951 | Howard et al. | 417/423.3 |
| 2,871,791 | 2/1959 | Litzenberg | 103/87 |
| 3,450,056 | 6/1969 | Heathcote et al. | 417/423.12 |
| 3,652,186 | 3/1972 | Carter | 417/423.3 |
| 3,694,110 | 9/1972 | Guinard | 417/423.3 |
| 3,716,309 | 2/1973 | Mitchell | 417/422 |
| 3,961,758 | 6/1976 | Morgan | 241/46.11 |
| 4,235,569 | 11/1980 | Wegner et al. | 417/423.3 |
| 4,454,078 | 6/1984 | Engelbrecht et al. | 261/93 |
| 4,454,993 | 6/1984 | Shibata et al. | 241/46 B |
| 4,541,782 | 9/1985 | Mohn | 417/244 |
| 4,650,342 | 3/1987 | Goodwin | 366/264 |
| 4,990,068 | 2/1991 | Zhong et al. | 417/423.8 |
| 5,101,128 | 3/1992 | Veronesi et al. | 310/54 |
| 5,185,545 | 2/1993 | Veronesi et al. | 310/114 |
| 5,213,468 | 5/1993 | Sexton et al. | 415/121.3 |
| 5,220,231 | 6/1993 | Veronesi et al. | 310/90 |
| 5,252,875 | 10/1993 | Veronesi et al. | 310/114 |
| 5,336,064 | 8/1994 | Lamers | 417/423.3 |
| 5,408,155 | 4/1995 | Dickinson et al. | 310/90 |
| 5,490,768 | 2/1996 | Veronesi et al. | 417/356 |

FOREIGN PATENT DOCUMENTS 1140177  11/1962  German Dem. Rep. .............. 366/264

Primary Examiner—Charles G. Freay

[57] ABSTRACT

A mixer pump used in a waste tank for mobilizing high-level radioactive liquid waste having a column assembly containing power cables, a motor housing with electric motor means which includes a stator can of a stator assembly and a rotor can of a rotor assembly, and an impeller assembly with an impeller connected to a shaft of the rotor assembly. The column assembly locates the motor housing with the electric motor means adjacent to the impeller which creates an hydraulic head, and which forces the liquid waste into the motor housing to cool the electric motor means and to lubricate radial and thrust bearing assemblies. Hard-on-hard bearing surfaces of the bearing assemblies and a ring assembly between the impeller and electric motor means act to grind down large particles in the liquid waste flow. These larger particles are received in slots in the static bearing members of the radial bearing assemblies. Only solid waste particles smaller than the clearances in the system can pass therethrough, thereby resisting damage to and the interruption of the operation of the mixer pump.

15 Claims, 8 Drawing Sheets

SUBMERSIBLE CANNED MOTOR MIXER PUMP

This invention was conceived or first reduced to practice in the course of, or under contract number DE-AC06-87RL10930 between the Westinghouse Hanford Company and the United States Government, represented by the Department of Energy. The United States Government may have rights in this invention.

RELATED PATENT APPLICATIONS

This Patent Application is related to two patent applications commonly assigned and owned, entitled "A Submersible Canned Motor Transfer Pump", Ser. No. 08/397,801, and "A Variable Level Suction Device", Ser. No.8/398,479, now abandoned, filed concurrently with this Patent Application.

BACKGROUND OF THE INVENTION

1. Field of the Invention

This invention relates to a motor mixer pump and more particularly to a submersible canned motor mixer pump which mobilizes or mixes high-level radioactive liquid waste or sludge inside a waste tank.

2. Background of Information

Motor mixer pumps are used to mix or mobilize high-level radioactive liquid waste inside a waste tank which is approximately 50 to 60 feet deep and which has a diameter ranging from about 75 to about 85 feet with liquid capacities of approximately one million gallons. The liquid waste is pumped out of the tank by a transfer pump and may be transferred to another tank or the liquid may be separated from the solid radioactive waste which is vitrified and collected in containers which generally are buried in underground concrete vaults.

Presently, mixer pumps have an air cooled motor supported on a riser located at the top of the waste tank with a length of either 24 inches, 34 inches or 42 inches. In order to accommodate the different size openings in the riser, different sizes of mixer pumps generally are used in a manner well-known in the art. The riser has an opening, and a mounting flange on the riser suspends a lineshaft through the opening and hangs down into the tank for an insertion length of up to about 58 feet for mobilizing the liquid waste in the tank. The environment in which the mixer pump operates is extremely abrasive and hostile in that the radiation exposure to the components of the mixer pump is up to about 300 megarads of gamma radiation. This radioactive liquid waste has a pH greater than 9.0; an absolute viscosity of 1.0 to 50.0 Cp; a specific gravity of about 1.0 to 1.7; a temperature of about 90° C.; and a relative humidity of up to about 100%. In addition, this liquid waste consists mainly of insoluble oxides and hydroxides of aluminum, iron, manganese, and zirconium in mixtures with water up to 50% solids by volume. These solid particles may have a diameter of up to about 0.040 inches.

These present-day mixer pumps with an air cooled motor driving a lineshaft from outside the waste tank employs a column which houses the lineshaft in the tank and is filled with pressurized water. At least 5 or more sets of bearings are mounted on the lineshaft to support the radial loads imposed on the long lineshaft, and the pressurized water in the column is used to lubricate the bearings. Mechanical seals are needed at the top and the bottom of the lineshaft to prevent the pressurized liquid in the column from escaping into the tank and to prevent the liquid waste in the tank from entering the column. Additionally, the column is comprised of several pipe pieces with flanges which are joined together requiring gaskets or seals, and the lineshaft consists of several shaft pieces coupled at about 10 ft. intervals. The bearings are located at the column pipe joints.

This present design for a mixer pump has several disadvantages; one being that it experiences a very short life in that it operates only for about 100 hours before it needs to be repaired or replaced. Another disadvantage is that the pressurized water in the column for lubricating the bearings leaks out of the column and into the contaminated liquid in the waste tank which adds to the amount of contaminated liquid which must be pumped out of the tank and processed. A further disadvantage is that the long lineshaft has poor rotor dynamic performance. With a multiple bearing system such as that in the present-day mixer pumps, if wear occurs at one bearing, shaft vibration will increase greatly. Alignment of a multiple bearing system is difficult. One or two bearings are always highly loaded and prone to wear and/or failure. The mixer pump has seals which must be maintained. The seals are rubbing face seals which wear with time, particularly, if abrasive particles are present. These seals must either be replaced which is difficult to do with a radioactive pump or the pump must be disposed of if the seals leak too much.

"Canned" motors are well-known in the art and are disclosed or discussed in U.S. Pat. Nos. 5,101,128; 5,185,545; 5,220,231; and 5,252,875 which relate to submersible motor propulsor units.

Thus, there remains a need for a mixer pump used for mobilizing high-level radioactive liquid waste in a waste tank which has a longer mechanical and electrical life expectancy than current designs for a mixer pump.

There remains a further need for a mixer pump used in the environment discussed hereinabove which has a longer life in that it has an improved dynamic performance compared to present-day mixer pumps and does not require seals to prevent liquid from escaping out of or seeping into the long column which houses the lineshaft.

SUMMARY OF THE INVENTION

The mixer pump of the present invention for mixing high-level radioactive liquid waste or sludge in a waste tank has met the above needs.

The mixer pump of the present invention includes a column which positions a canned electrical motor down into a waste tank. The motor is housed in a housing connected to the column and has a canned stator, a canned rotor, and a rotatable shaft with an impeller connected to the shaft. A radial bearing assembly is provided on one end of the shaft. A radial bearing assembly and a thrust bearing assembly are provided on the other end of the shaft. The impeller is housed in a casing which includes suction means for drawing the liquid waste into the casing and discharge nozzles for discharging part of the liquid waste back into the tank. Some of the liquid waste which is not discharged out of the casing is forced to flow by the impeller up into the electric motor to lubricate the bearing assemblies and into an annulus formed by the canned rotor and the canned stator for cooling the motor. At least the radial bearing assemblies are of the hard-on-hard type, with the bearing elements being preferably made of tungsten carbide, and whose bearing surfaces can function to grind the large solid particles of the liquid waste which being pushed through by the process fluid make their way between the bearing surfaces. Slots are provided preferably in the static bearing members of the radial bearing assemblies so that the large solid particles are ground up in the slots and forced through the slots and properly disposed of.

The speed of the impeller and the design of the suction means and the discharge nozzles are such that a portion of the liquid waste is forced upwardly into the bearing assemblies and the electric motor to lubricate the bearing assemblies and to cool the motor.

A purging system is also provided to clean out the liquid waste flow paths under certain conditions such as when the mixer pump has not been used for any length of time. The column supports the purging system and carries power cables for an electrical connection to the motor. A sparging system delivers fresh water to a sparge ring located in the suction means.

It is therefore an object of the present invention to provide a motor mixer pump which has a canned electric motor which is submerged in liquid waste and which uses the liquid waste to cool the motor and to lubricate the bearings.

It is a further object of the present invention to provide an improved mixer pump used in a waste tank containing highly radioactive liquid waste and having a submersible canned motor which is cooled by the liquid waste and fluid-film type of bearing assemblies which are lubricated by the liquid waste.

It is a still further object of the present invention to provide an improved mixer pump used in an abrasive, highly-radioactive environment which has a longer operating life than prior art mixer pumps.

It is still a further object of the invention to provide an improved mixer pump which positions a "canned" motor near an impeller assembly which draws in and discharges some of the liquid waste.

A still further object of the present invention is to provide an improved mixer pump which uses the liquid waste to lubricate the radial and thrust bearing assemblies which include hard-on-hard bearing members with surfaces which form a fluid film therebetween for said lubrication, and which hard-on-hard bearing surfaces act to further grind down large liquid waste particles in the liquid waste flow.

Moreover, it is a further object of the present invention to provide a mixer pump which includes a "grinding device" which initially grinds the large waste particles before they can enter the bearing assemblies.

And yet a still further object of the present invention is to provide a mixer pump which includes abrasive means for grinding and/or discharging large particles of a liquid waste prior to their entering either the bearing assemblies and/or the electric motor means so that only particles less than the size of the radial and/or axial clearances in the system can pass through the system with the processed liquid flow, thereby resisting damage to the mixer pump and/or decreasing the chances for interrupting the operation of the mixer pump.

BRIEF DESCRIPTION OF THE DRAWINGS

A full understanding of the invention can be gained from the following description of the preferred embodiment of the present invention when read in conjunction with the accompanying drawings in which.

DESCRIPTION OF THE PREFERRED EMBODIMENT

Figure 1:
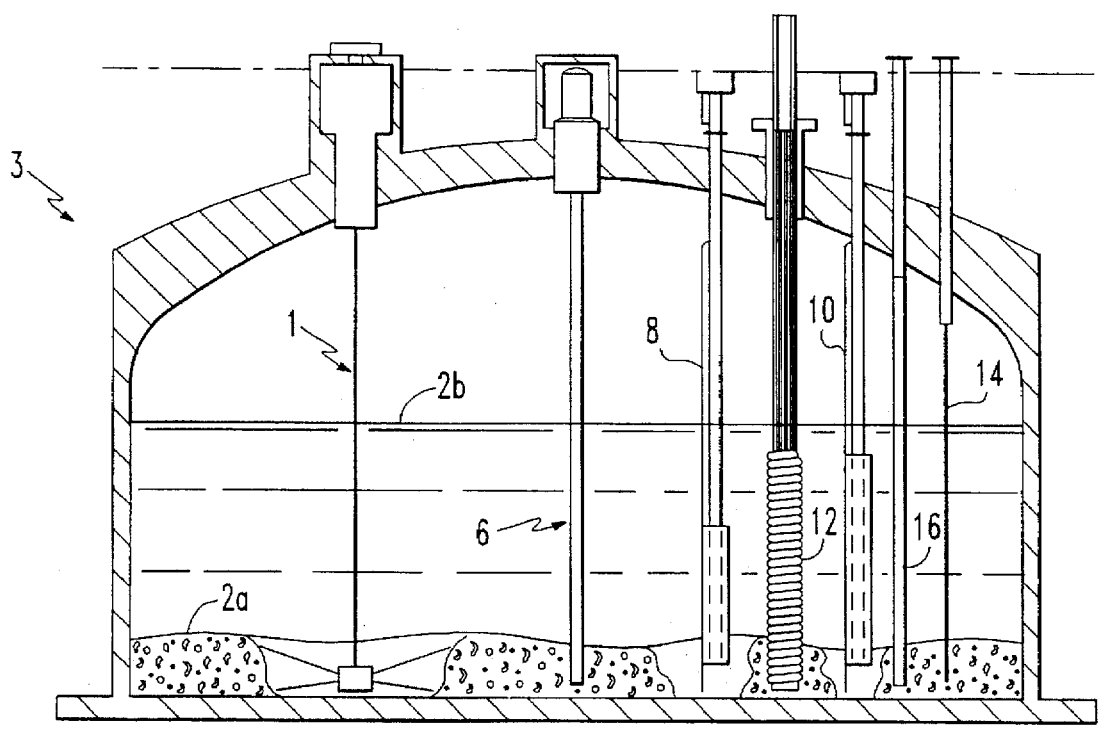
FIG. 1 is a schematic of a waste tank showing the several devices including a mixer pump of the prior art having a lineshaft extending down into a waste tank.

Referring first to FIG. 1, there is shown a mixer pump 1 of the prior art in a waste tank 3 for mixing or agitating highly radioactive and abrasive liquid waste 2 out of tank 3, which liquid waste 2 contains a sludge 2a on the bottom of tank 3 and a liquid indicated at line level 2b.

Further devices whose operations and function are well-known in the art for processing the liquid waste 2 in tank 3 of FIG. 1 include a transfer pump 6 which transfer the liquid waste 2 out of tank 3, air lift circulators 8 and 10, a steam column 12, and a thermocouple tree 14 which is separated from air circulator 10 by a drywall 16.

Figure 2:
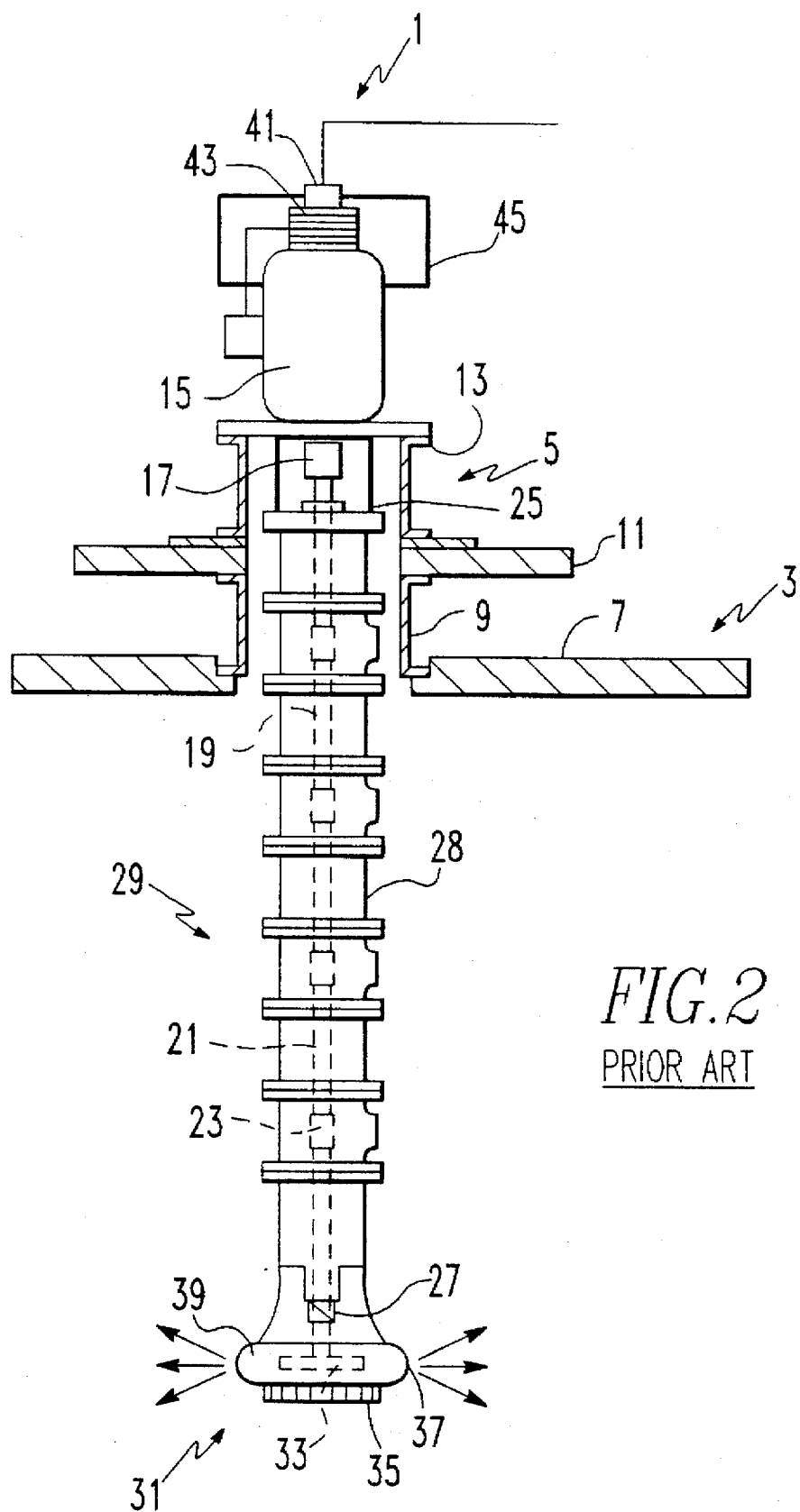
FIG. 2 is a schematic of a mixer pump of the prior art of FIG. 1.

Referring to FIG. 2, mixer pump 1 of FIG. 1 may be similar to that discussed hereinabove. Mixer pump 1 is mounted on a riser 5 which is supported on the top 7 of waste tank 3. Riser 5 consists of a lower riser member 9 supported by the top 7 of waste tank 3, a turntable 11 supported on lower riser 9, and an upper riser member 13 which supports an air-cooled electric motor 15.

Connected by way of a rigid coupling 17 to an output shaft (not shown) of motor 15 is a lineshaft 19 which is comprised of a plurality of individual shaft sections, one of which is indicated at numeral 21, and several bearing assemblies one of which is indicated at numeral 23. Lineshaft 19 has a top mechanical seal 25 and a bottom mechanical seal 27, and is housed in a column assembly 29 which is comprised of a plurality of flanged column sections, one of which is indicated at numeral 28. The flanged column sections 28 have a carbon bushing therebetween. The lower end of column assembly 29 has an impeller assembly 31 with an impeller 33 connected to lineshaft 19, which impeller assembly 31 and lineshaft 19 are basically rotated by turntable 11.

Impeller assembly 31 has a liquid waste suction inlet (not shown) with a suction screen 35 and diametrically opposed discharge nozzles 37 and 39.

The length of each shaft piece section 21 is about 10 feet, the length of each column section 28 is about 5 feet, and the length of the column assembly 29 including the impeller 31 assembly is about 45 feet.

Motor 15 has a rotary joint 41, an electrical slip ring 43, and a rain cover 45, and supplies approximately 460 volts. Water, under pressure, is supplied to mixer pump 1 by way of rotary joint 41. This pressurized water is required for cooling and/or lubricating lineshaft 19, the carbon bushings between flanged column sections 28, and top and bottom mechanical seals 25 and 27, respectively.

Upper riser member 13 acts as a secondary containment for the escape of radiation from waste tank 3, and lower riser member 9 acts as a spray chamber for decontamination when mixer pump 1 is removed from waste tank 3.

FIG. 2 represents a typical present-day mixer pump and has all or some of the disadvantages discussed hereinabove.

Figure 3:
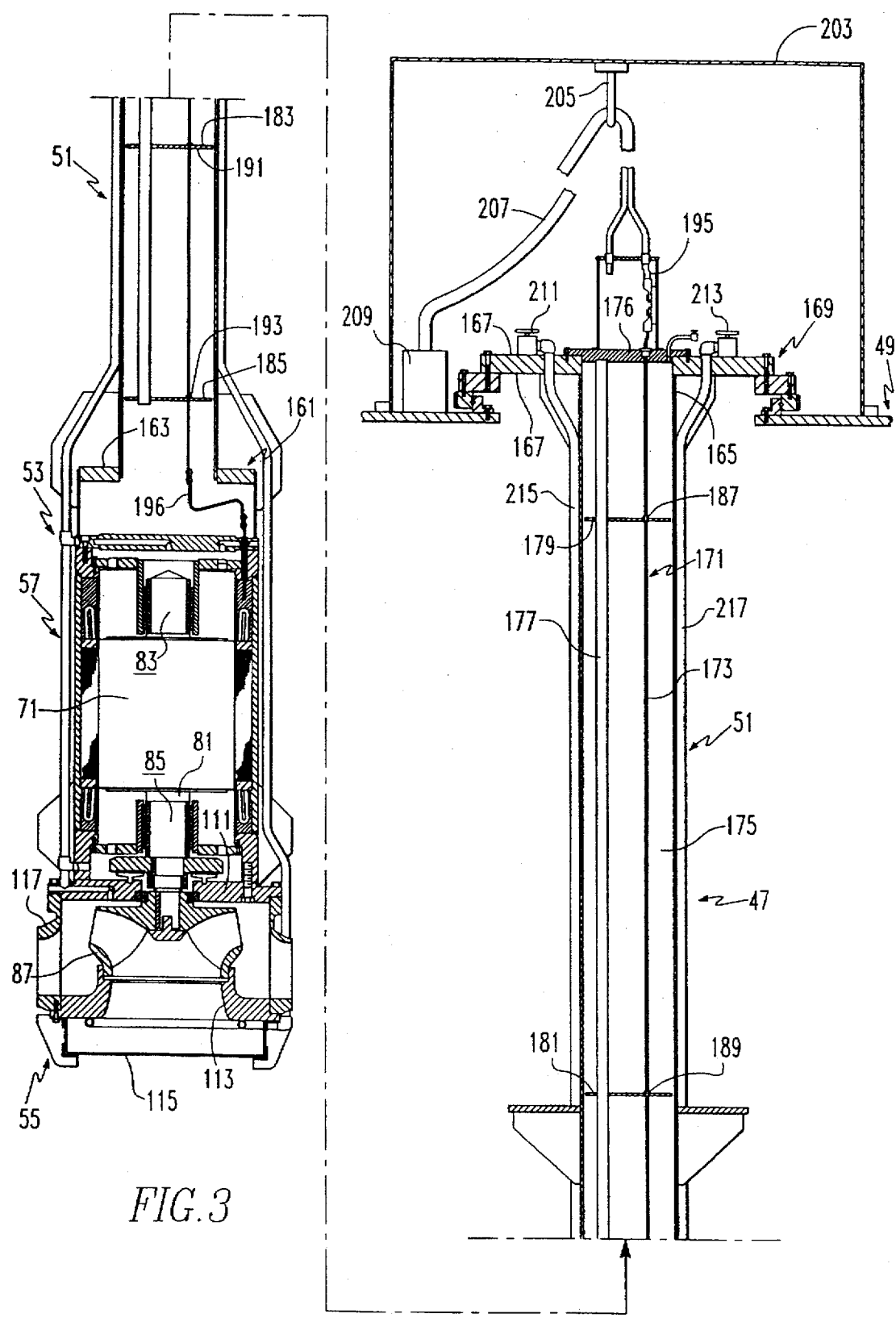
FIG. 3 is a vertical cross-sectional view of a mixer pump of the present invention.

FIGS. 3, 4, 5, 6, 7, 8, 9 and 10 represent a mixer pump of the present invention. Referring particularly to FIGS. 3, mixer pump 47 is shown in use in a waste tank 49 located in the ground and containing high-level radioactive liquid waste having a gamma radiation exposure of about 300 megarads, and which liquid waste consists mainly of insoluble oxides/hydroxides of aluminum, iron, manganese, and zirconium in water mixtures up to 50% solids by volume. This liquid waste is to be first mixed or mobilized by mixer pump 47 and then drawn out of waste tank 49 by a transfer pump (not shown) which may be similar to that disclosed in a patent application being filed concurrently as this patent application and entitled, "A Submersible Canned Motor Transfer Pump", and which liquid waste is ultimately transformed in a vitrification process.

Waste tank 49 may have a liquid capacity of about one million gallons, is about 60 feet deep, and has an inner diameter of about 75 to 85 feet.

Mixer pump 47 is comprised of a column assembly 51, housing means 53 connected to column assembly 51, and an impeller assembly 55 mounted to housing means 53.

Figure 4:
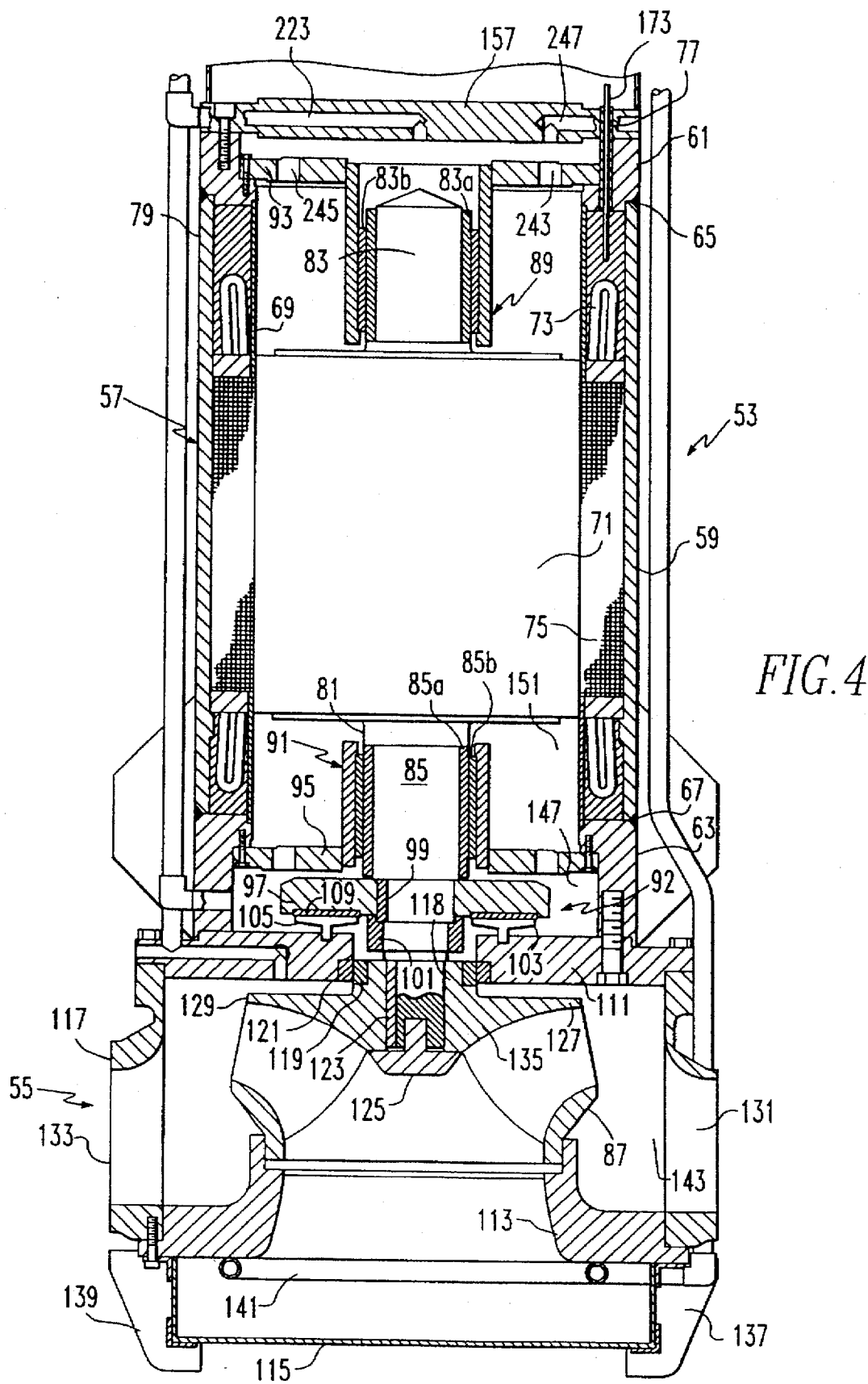
FIG. 4 is an enlarged, cross-sectional, partial view showing the electrical motor means and the impeller assembly of FIG. 3.
Figure 5:
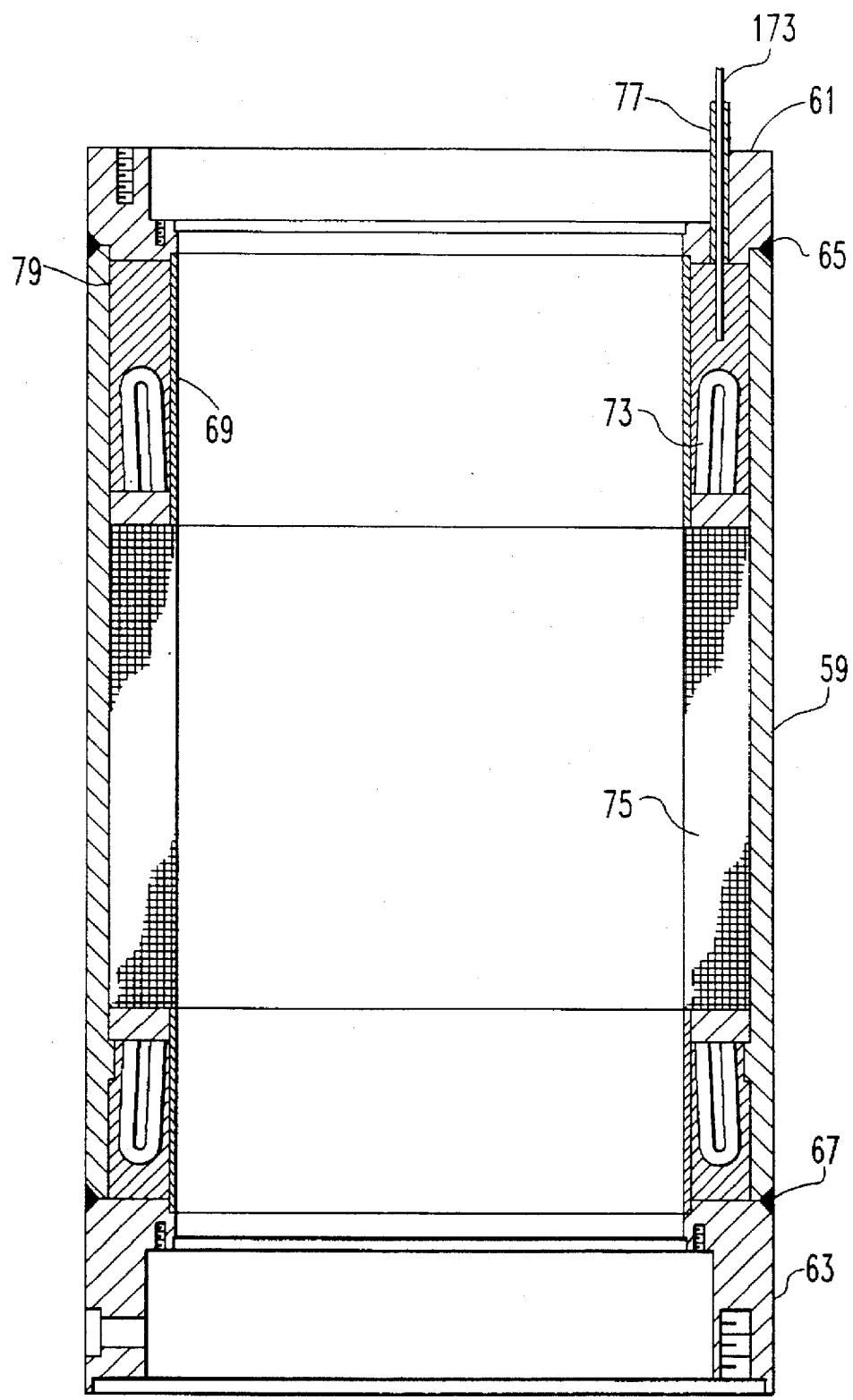
FIG. 5 is a cross-sectional, partial view showing the stator assembly of the electric motor means of FIG. 4.

Referring particularly to FIGS. 4 and 5, housing means 53 encloses an electric motor means 57 which is the driving means for mixer pump 47, and is comprised of a stator assembly having an outer annular shell 59, an upper annular closure member 61 and a lower annular closure member 63, both of which are welded as indicated at numerals 65 and 67 in FIGS. 4 and 5 to the ends of annular shell 59 and an inner annular stator can 69 connected to upper and lower closure members 61 and 63.

Figure 6:
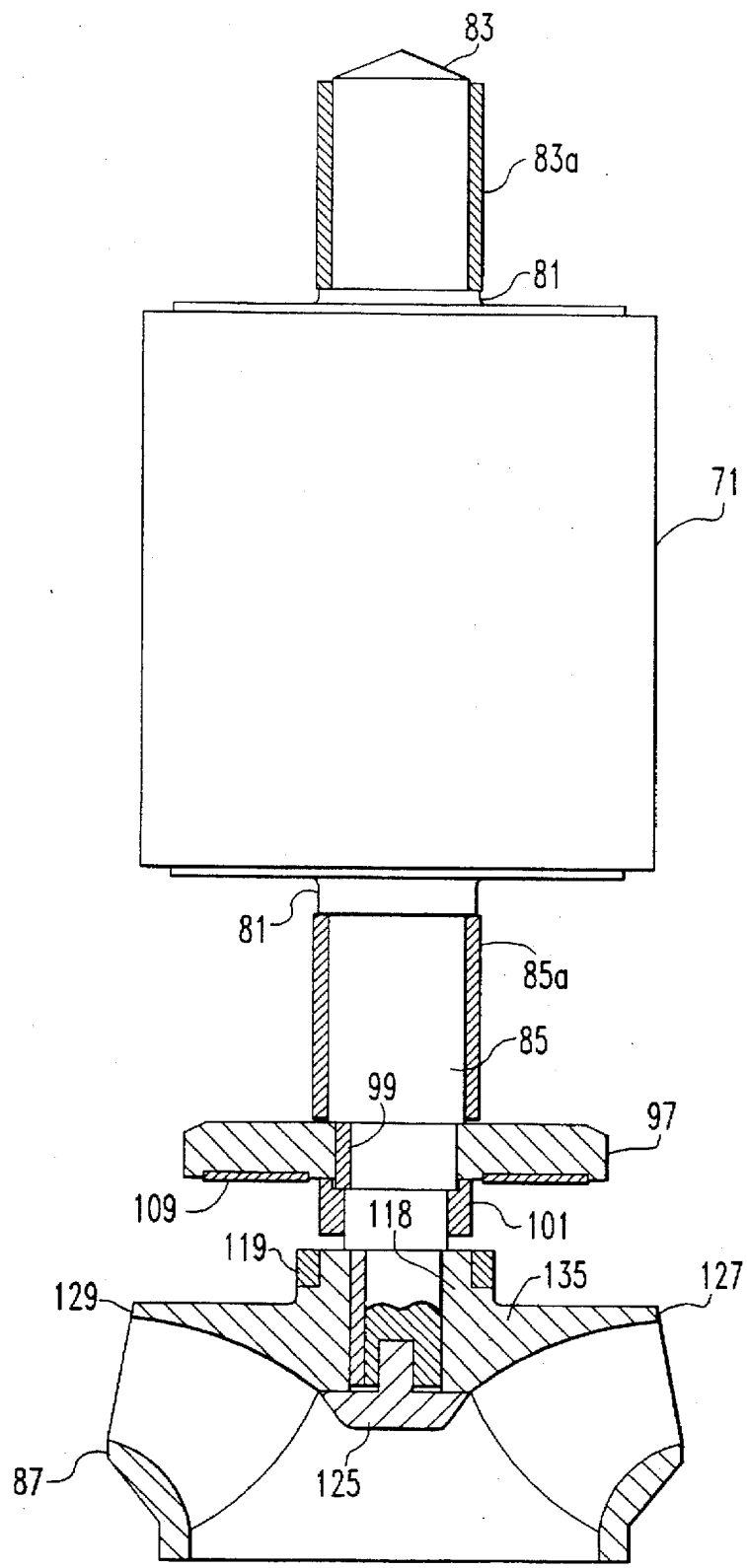
FIG. 6 is a cross-sectional, partial view showing the rotor assembly of the electric motor means of FIG. 4.

Electric motor means 57 has a "canned" stator assembly as shown in FIGS. 4 and 5 and a "canned" rotor assembly as particularly shown in FIG. 6, which are well-known in the art of electric motors, and which are "canned" to prevent fluid from contacting the electrical components. The can 69 for the stator assembly of FIG. 5, and the rotor can 71 for the rotor assembly of FIG. 6 are made of a corrosion, resistant type of material, such as HASTELLOY® C276 which is generally a specialty steel alloy and available from the Cabot Corporation.

The cans 69 and 71 respectively of stator and rotor assemblies of FIGS. 5 and 6 are fitted into place and welded to their respective housing by welding after the rotor assembly and the stator assembly are electrically connected. Cans 69 and 71 permit the liquid waste which is processed by the mixer pump 47, hereinafter which may be referred to as the "processed fluid" to flow into the annulus formed by the canned stator assembly and the canned rotor assembly to cool electric motor means 57, more about which will be discussed hereinafter.

Electric motor means 57 may be a squirrel cage induction-type motor. The stator windings 73 (FIGS. 4 and 5) and the rotor cores (not shown) may be a silicon steel laminations, and the stator core 75 (FIGS. 4 and 5) are randomly wound coils.

One of the objects of the present invention is to employ two sizes of mixer pumps for the three different size risers of a waste tank. For a smaller size mixer pump 47, the electric motor means 57 is preferably a 250 horsepower, 10-pole machine that operates at 648 revolutions per minute (RPM) with 460 volts, three phase 60 Hertz power supply. For a larger size mixer pump, the electric motor means 57 is preferably a 250 horsepower, 6-pole machine that operates at 1155 RPM with a 60 hertz power supply.

The electrical power supply to electric motor means 57 is supplied to the stator assembly of FIGS. 4 and 5 by means of a power cable, shown in FIG. 3, which extends through a tube 77 (FIG. 4) welded in upper annular closure member 61.

As particularly shown in FIG. 4, can 69 and outer shell 59 for the stator assembly form an annular cavity 79. In order to improve the heat transfer from the end turns of stator windings 73 and to prevent the entry of air or moisture into annular cavity 79, annular cavity 79 is completely potted up to upper closure member 61 with a sand-silicon varnish mixture which is generally baked around the windings 73 to form a hard, thermally conductive solid. Otherwise, the stator assembly of FIGS. 3–5 is adequately cooled by the processed fluid passing over the outside surface of the stator can 69, more about which will be discussed hereinafter.

The typical insulation of stator core 75 and the potting in stator cavity 79 forms an insulation system for electrical motor means 57, which is considered by the inventors to be more than adequate for a radiation exposure of 300 megarads caused by the liquid waste in tank 49 which is expected over a 10 year operating life for mixer pump 47.

The insulation system has been tested to a radiation level of 1000 megarads, and has shown no significant reduction in electrical performance of electric motor means 57. The insulation for core 75 may also be mica or glass.

Referring now to FIGS. 3, 4, and 6, and particularly FIG. 6, the rotor assembly of electric motor means 57 is comprised of a rotor (not shown) in can 71, shaft 81 extending through rotor can 71, journals 83 and 85 connected to the ends of shaft 81, and an impeller 87.

The rotor (not shown) in rotor can 71 of the rotor assembly, preferably, is magnetic with slots machined in the rotor for the rotor bars. The rotor, preferably, has copper bars and end rings brazed together to form the traditional type of squirrel cage rotor assembly. Rotor can 71 is welded to shaft 81 to hermetically seal and isolate the squirrel cage components of the rotor from the processed fluid. The rotor components in rotor can 71 are cooled by the processed liquid flowing over shaft 81 and into the annulus formed by the stator can 69 and the rotor can 71, more about which will be discussed hereinafter.

Referring particularly to FIG. 4, both the upper and lower ends of shaft 81 include the journals 83 and 85, respectively. Upper journal 83 includes a radial bearing assembly 89, and lower journal 85 includes a radial bearing assembly 91 and a thrust bearing assembly 92.

Journals 83 and 85 are, preferably, made of a hard material, such as tungsten carbide, and constitute rotating bearing members 83a, 85a with bearing surfaces for radial bearing assemblies 89 and 91, respectively of FIG. 4. Journals 83 and 85 are slotted on their ends, and each journal is secured axially and radially to shaft 81 by a tabbed retaining ring (not shown) which is shrunk onto and fastened to shaft 81.

Radial bearing assemblies 89 and 91 as best shown in FIG. 4 further include a stationary bearing member 83b and 85b, respectively, which run against the bearing members 83a, 85a of journals 83 and 85, respectively, on rotor shaft 81 and which static bearing members 83*b* and 85*b* are mounted on an annular housing 93 and 95, respectively. Preferably, static bearing members 83*b*, 85*b* are made of a hard material, such as tungsten carbide and undergo a shrink fit process for mounting thereof on annular housings, 93 and 95, respectively.

The bearing span formed by journals 83 and 85 and the bearing members 83*a*, 83*b*, 85*a*, and 85*b* for radial bearing assemblies 89 and 91 are relatively short, thus the required alignment for these two bearing assemblies 89 and 91 can be controlled by the manufacturing process, and consequently no self-alignment feature for bearing assemblies 89 and 91 is required. That is, the tolerances placed on bearing members 83*a*, 83*b*, 85*a*, 85*b*, limit the angular misalignment between these members when the outer diameter, the inner diameter, and the concentricity of these bearing members are controlled. The configuration and length of journals 83 and 85 and the arrangement of static bearing member 83*b* and 85*b* with rotating bearing members 83*a* and 83*b* create a fluid-film riding and self-lubricating bearing assembly for radial bearing assemblies 89 and 91, which eliminate the need for any rotating seals, any contacting bearings, and/or any separate lubrication systems, which generally are necessary for the radial bearing assemblies of the prior art.

Figure 9:
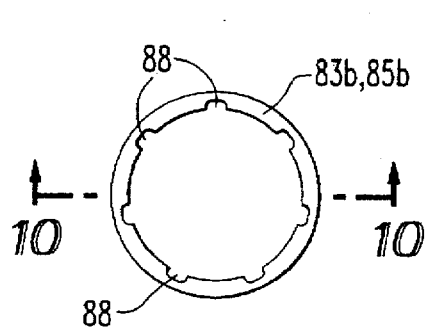
FIG. 9 is a plan view of the outer static bearing members for the radial bearing assemblies.
Figure 10:
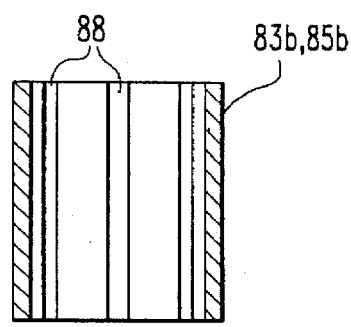
FIG. 10 is a cross-sectional view of the outer bearing members taken along line 10—10 of FIG. 9.

As shown in FIGS. 9 and 10, static bearing members 83*b* and 85*b* have axial slots some of which are indicated at 88 which allow solid particles of the liquid waste in tank 49 of FIG. 3 which are larger than the radial clearances between bearing members 83*a* and 83*b* and between bearing members 85*a* and 85*b* to be ground up in the slots 88 and thereafter to pass through and out of radial bearing assemblies 89 and 91. As shown in FIG. 10, these slots are located in the inner surface of bearing members 83*b* and 85*b*, and are axial grooves therein. Preferably, the depth of axial slots 88 is less than the clearance or annulus formed by stator can 69 and rotor can 71. The depth of slots is about 0.14 inches and its width is about 0.35 inches. Even though slots 88 are indicated as being axial grooves relative to bearing members 83B and 85B, it is to be appreciated that slots 88 may be helical or skewed grooves. Preferably, rotating bearing members 83*a*, 85*a* have a continuous inner surface along their length.

As best shown in FIG. 4, annular housing 93 is bolted to upper closure member 61, and annular housing 95 is bolted to lower closure member 63. Annular housings 93 and 95 of radial bearing assemblies 89 and 91, respectively, are preferably, made of stainless steel.

Located adjacent to journal 85 of lower radial bearing assembly 91 and mounted on shaft 81 is thrust bearing assembly 92. Thrust bearing assembly 92 is comprised of a thrust runner 97 which is secured radially to rotor shaft 81 by a key 99, and which is secured axially to shaft 81 by a thrust runner nut 101. Thrust bearing assembly 92 is further comprised of thrust shoes, indicated at numerals 103 and 105 in FIG. 4, more about which will be discussed hereinbelow.

Thrust runner 97 is preferably made of stainless steel and contains a continuous ring 109 located on its undersurface, and as particularly shown in FIG. 4, and which run against the thrust shoes 103 and 105. This bearing member 109 of thrust runner 97, as well as thrust shoes 103 and 105, is preferably, made of a hard material, such as tungsten carbide or silicon carbide. Ring bearing member 109 is attached to the undersurface of thrust runner 97 through a shrink fit process. Thrust shoes 103 and 105 are mounted in a lower end plate 111 which is bolted to lower annular closure member 63 shown best in FIG. 4. As in the case of radial bearing assemblies 89 and 91, the manufacturing process of thrust shoes 103 and 105 and thrust bearing member 109 of thrust bearing assembly 91 through appropriate tolerances control the bearing alignment without the need for self-alignment of thrust bearing assembly 92 such that any angular misalignment at the thrust bearing assembly 92 is acceptable.

The hard-on-hard radial bearing assemblies 89 and 91, as discussed hereinabove, employ axial slots in bearing members 83*b* and 85*b* which extend on the inner surface thereof along their respective lengths as particularly shown in FIGS. 9 and 10 and which allow the larger particles of the liquid waste which enter the radial bearing assemblies 89 and 91 to be flushed out by the process liquid without damage to any components of the mixer pump 47.

The type of material, which preferably is tungsten carbide, for the bearing components of radial bearing assemblies 89 and 91 and thrust bearing assembly 92 is considered by the inventors as being compatible with the high pH chemistry of the liquid waste, is generally highly abrasive resistant, and therefore, is generally suitable for the type of liquid waste in which the mixer pump of the present invention is employed in that the liquid waste has a high viscosity and is highly abrasive.

Referring to FIGS. 3, 4 and 6, located adjacent to thrust bearing assembly 92 and mounted on rotor shaft 81 and partially extending into lower end plate 111 is impeller assembly 55 which consists of impeller 87, a suction adapter 113 connected to impeller 87, an inlet screen 115 attached to suction adapter 113, and a casing 117 enclosing impeller 87 and suction adapter 113.

As shown best in FIGS. 4 and 6, an impeller hub 118 of impeller 87 has a tungsten carbide ring 119 and lower end plate 111 has a tungsten carbide ring 121. Rings 119 and 121 cooperate with each other to act as a "grinder" for the large particles in the processed fluid of liquid waste, more about which will be discussed hereinafter.

Referring to FIG. 4, impeller 87 is secured radially to rotor shaft 81 by key 123 and is secured axially to shaft 81 by an impeller bolt 125. Impeller 87, preferably, has five vanes (two of which are shown and indicated at numerals 127 and 129), is fully shrouded, and is a stainless steel casting. Impeller 87 may range from about 18 to 23 inches in diameter.

Casing 117 which encloses impeller 87 is, preferably, made of stainless steel, and is bolted to lower end plate 111. Casing 117, preferably, acts as a dumped diffusion device. Casing 117 has two radial discharge nozzles 131 and 133 which are about 180° apart.

When mixer pump 47 of the invention of FIG. 3 is fully inserted into tank 49, discharge nozzles 131 and 133 may be spaced approximately 15 to 17.5 inches from the bottom of tank 49, depending on the size of mixer pump 47.

As shown best in FIG. 4, impeller 87 includes a hub 118 and upper shroud 135 and is seated at its lower end in suction adapter 113, and at its upper end in lower end plate 111 by way of rings 119 and 121. Suction adapter 113 is bolted to casing 117 near discharge nozzles 131 and 133 best shown in FIG. 4.

Suction adapter 113 is preferably a stainless steel casing which supports inlet screen 115 by way of guide pins or vanes, two of which are indicated at numerals 137 and 139. When mixer pump 47 is being installed in tank 49, vanes or guide pins 137 and 139 help to guide mixer pump into tank 49. During operation of mixer pump 47, guide pins 137 and 139 act to reduce any vortexing of the liquid waste which may occur in the suction inlet area.

Inlet screen 115, which is supported by suction adaptor 113, has a mesh which is sized to resist the entry of any solid particles which could damage or block the hydraulics of impeller assembly 55 of mixer pump 47, which hydraulics are basically created by impeller 87, casing 117 and suction adapter 113.

The flow area of inlet screen 115 is large enough to minimize the velocity of the flow of the liquid waste into impeller 87 and to reduce the head loss across the inlet screen 115. A sparge ring 141 is located at the bottom of suction adapter 113 to back flush the inlet screen and to disperse any heavy sludge from the suction area of suction adapter 113 which may be picked up in this area when mixer pump 47 is being installed into tank 49, and more about which will be discussed hereinbelow.

As stated hereinabove, the components of impeller assembly 55 for creating the hydraulics for mixer pump 47 consists of suction adapter 113, a five-vane fully shrouded impeller 87, and a dumped diffusion casing 117. The sizing of the hydraulics for mixer pump 87 is based on a desired maximum electrical input of 350 horsepower (261.1 kw) at design conditions. The effectiveness of mixer pump 47 with regard to mobilizing the sludge from the liquid waste is based on the nozzle discharge coefficient, which is the product of the diameter of radial discharge nozzles 131 and 133 of casing 117 and the exit velocity of the discharge of the liquid waste for these radial discharge nozzles 131 and 133. For the smaller size mixer pump 47 as discussed hereinabove, the nozzle coefficient may be about 26.1 feet$^2$ per second, and for a larger size mixer pump 47 as discussed hereinabove, the nozzle coefficient may be about 34.4 feet$^2$ per second.

The maximum diameter for radial discharge nozzles 131 and 133 of casing 117 is about 22.5 inches for the smaller size mixer pump 47, and about 40.5 inches for the larger size mixer pump. A suction speed limitation of about 12,000 at 16 feet of available net positive suction head (NPSH) was imposed for the hydraulics based on the experience of Westinghouse personnel which resulted in zero head-loss operating conditions for the impeller assembly 87 with the impeller assembly 87 being free of any damage thereto.

Figure 8:
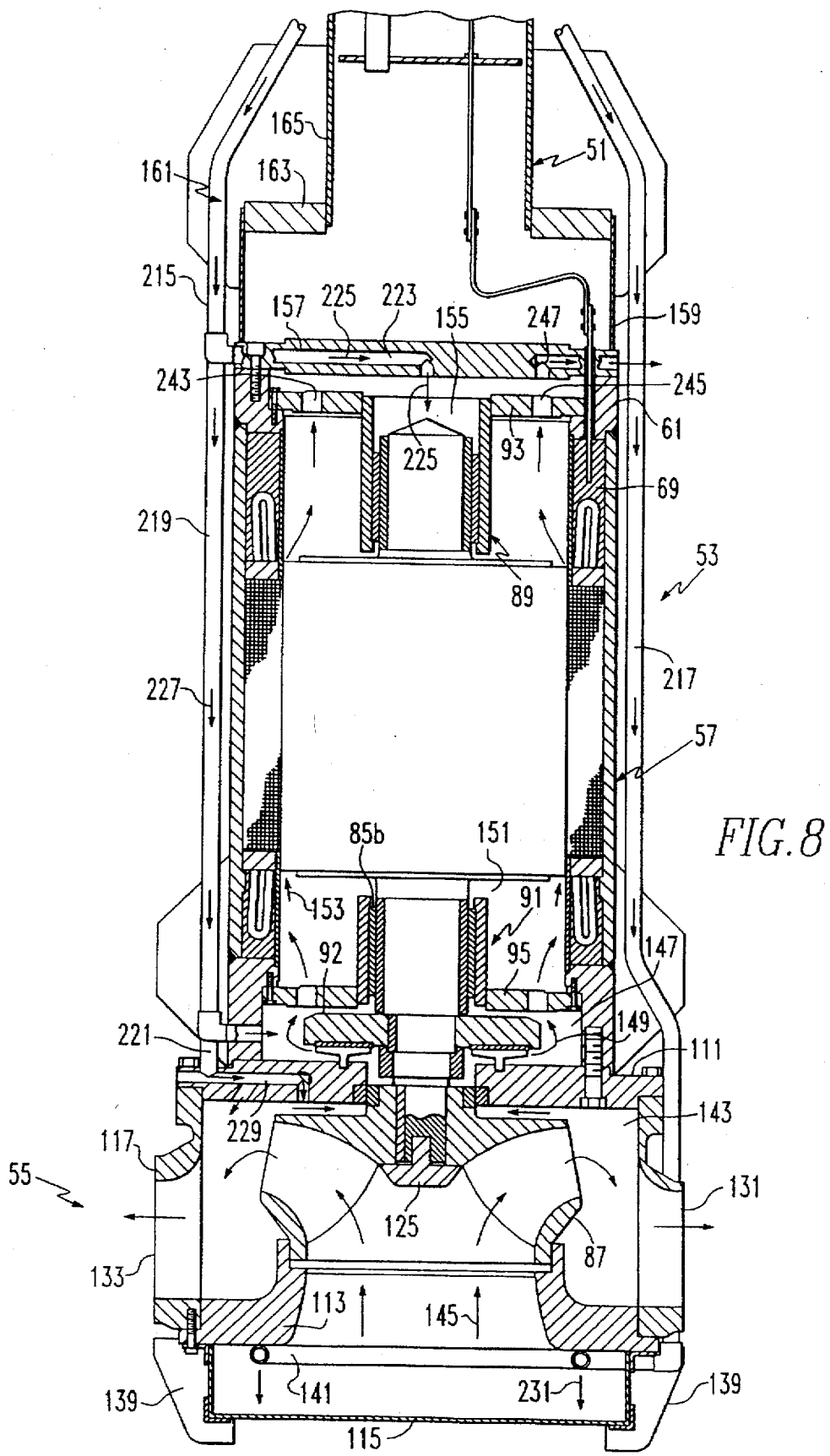
FIG. 8 is an enlarged, cross-sectional, partial view showing the flow paths for the liquid waste and for the fresh water through the impeller assembly and electric motor means of the mixer pump of the present invention.

Referring particularly to FIG. 8, suction adapter 113, casing 117 and lower end plate 111 form an impeller cavity 143 through which the processed liquid waste flows in a direction as indicated by the several arrows, one of which is indicated by numeral 145. Immediately above impeller cavity 143 is a thrust bearing cavity 147 formed by lower end plate 111 and lower annular housing 95, in which the processed liquid waste further flows in a direction as indicated by the arrows, one of which is indicated by numeral 149. Immediately above thrust bearing cavity 147 is a motor cavity 151 formed by upper and lower annular housings 93 and 95, respectively, and stator can 69, through which the processed liquid waste flows in the direction as indicated by the several arrows, one of which is indicated at numeral 153. Immediately above motor cavity 151 is a cavity 155 formed by upper annular housing 93 and an upper end plate 157, which is bolted to upper annular closure member 61.

Upper end plate 157 is, preferably, made of stainless steel and is welded to an annular member 159. Annular member 159 is part of a cap assembly 161 which further consists of an annular support plate 163. Annular support plate 163 is welded to annular member 159 and column assembly 51.

Referring particularly to FIG. 3, column assembly 51 consists preferably of a fabricated 16 inch outer pipe 165 which is welded to annular support plate 163 of cap assembly 161 at its one end and to a mounting flange 167 at its other end which suspends mixer pump 47 from a rotatable turntable assembly 169.

Figure 7:
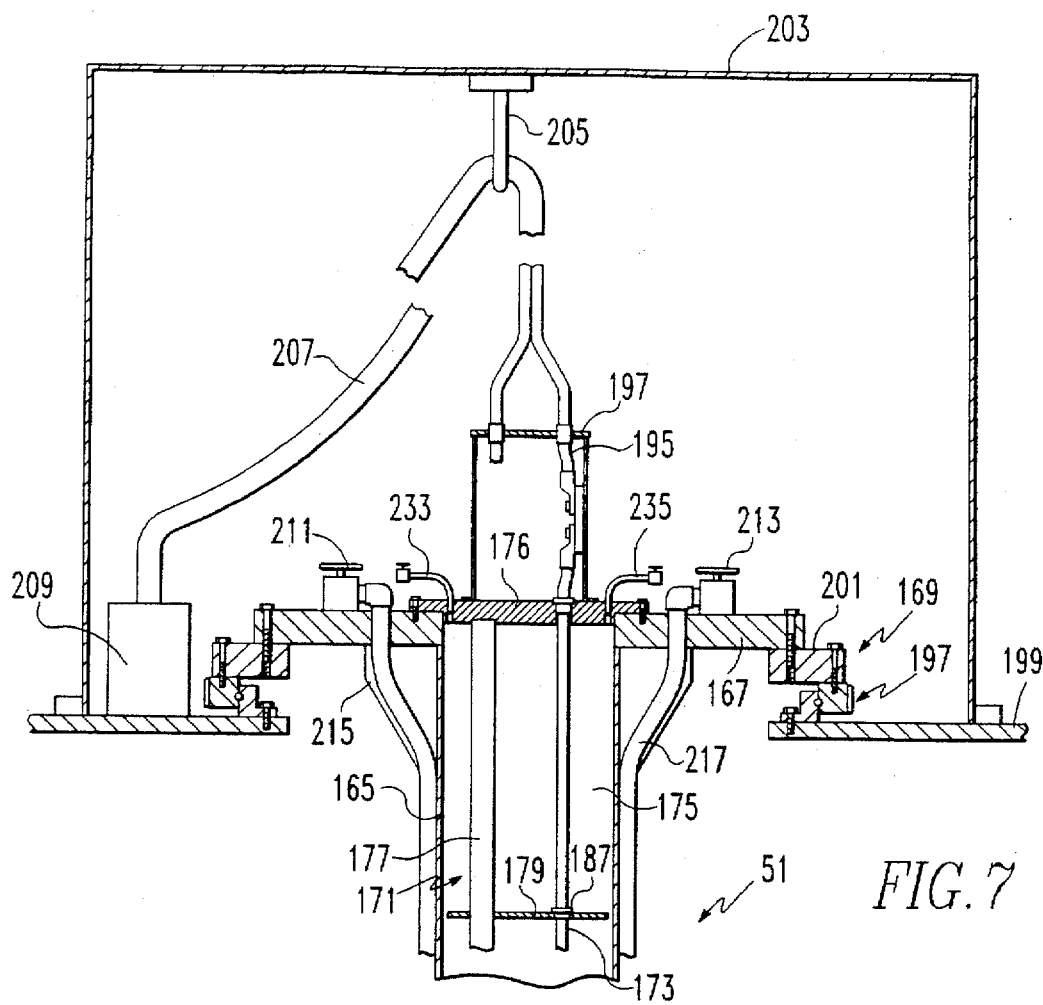
FIG. 7 is an enlarged, cross-sectional, partial view showing the upper portion of the mixer pump of FIG. 3.

Referring particularly to FIGS. 3 and 7, column assembly 51 further consists of a cable tray assembly 171 which, in essence, supports severable cables, one of which is indicated at numeral 173 and which is shown as extending in a cavity 175 formed by pipe 165 of column assembly 51. Cable tray assembly 171, in addition to the power cables 173 is comprised of an upper closure plate 176 which is bolted to mounting flange 167 and which closes off cavity 175 at the upper end of pipe 165, a support tube 177 which extends through cavity 175 and parallel to power cable 173, and a plurality of tray guides 179,181,183, and 185, shown best in FIG. 3.

As is shown in FIG. 3, support tube 177 and cable 173 extend through tray guides 179,181,183, and 185, which may be spaced every 3 to 8 feet, with support tube 177 being welded in tray guides 179–185 and cable 173 being held in tray guides 179–185 by means such as electrical cable grips indicated at numerals 187,189,191, and 193, respectively.

Referring particularly to FIG. 7, the three power cables 173 each carry a single phase for a three phase 460 volt electrical supply to the electric motor means 57 of mixer pump 47, and are connected at the upper end of column assembly 51 to leads 195 in an explosion proof auxiliary terminal box 197 mounted on closure plate 176 of cable tray assembly 171. Referring particularly to FIG. 3, power cable 173 is connected at the lower end of column assembly 51 to electric motor means 57 by a terminal flexible strap 196 located in cap assembly 161.

Referring again to FIG. 7, rotatable turntable assembly 169 is comprised of a bearing and gear assembly 197 bolted to a fixed mounting plate 199, a bearing plate 201, bolted to and associated with bearing and gear assembly 197, a drive assembly (not shown) for driving bearing and gear assembly 197, and mounting flange 167 which is bolted to bearing plate 201 and which supports closure plate 176. The drive assembly (not shown) generally may consist of a totally enclosed 0.5 horsepower motor, a variable speed belt drive, and a speed reducer, and generally has the capacity to rotate turntable assembly 169 up to about 0.5 revolutions per minute, and about a vertical axis for mixer pump 47 in an oscillatory 180° angular motion. The oscillatory motion aids in mobilizing the sludge in waste tank 49.

Still referring to FIGS. 3 and 7, turntable assembly 169 is protected from the elements by a rain cover 203 which is bolted to fixed mounting plate 199, and contains several hanger members for supporting both the power lines, the fresh water lines and, if necessary a nitrogen gas supply line connected to the mixer pump 47. In FIG. 3, only one hanger member 205 is shown for supporting a flexible power cable 207 for supplying electrical power to the several components of mixer pump 47. The power lines, water lines, and gas lines are, preferably, flexible so as to be able to move with the rotation of turntable assembly 169. The power cable 207 is connected to a customer interface termination box 209 which is supported on fixed mounting plate 199.

Mounting flange 167 carries a purge line connection joint 211 and a sparge line connection joint 213 which are connected to a fresh water supply system (not shown) and to feed pipes 215 and 217 which run parallel to and externally of column assembly 51. As best shown in FIG. 8, preferably, three separate purge feed pipe lines 215,219, and 221 are provided, where, as particularly shown in FIG. 8, pipe line 215 delivers fresh water into a radial port 223 of upper end plate 157, which port 223, in turn, delivers the fresh water into cavity 155 and onto upper radial bearing assembly 89, the flow path of which is indicated by the arrows at numeral 225. Feed line 219 delivers fresh water into cavity 147 for lower radial bearing assembly 91 and thrust bearing assembly 92, the flow path of which is indicated by the arrows at numeral 227. Feed line 221 delivers fresh water through radial port 229 of lower end plate 111, which, in turn, directs the water into impeller cavity 143 and onto impeller 87. Basically, one sparge line 217 is provided and delivers fresh water to sparge ring 141 in inlet screen 115 of impeller assembly 55, the flow path of which is in the direction of the arrows, one of which is indicated at 231. The fresh water in sparge ring 141 back flushes the inlet screen 115 and cleans the suction inlet area as mixer pump 47 is being installed into waste tank 49 in order to ensure free flow of the passages therein.

Purge feed lines 215,219 and 221 can be used to flush the process fluid out of mixer pump 47 either immediately after the mixer pump is shut down, or after an extended layup for the mixer pump, and/or immediately prior to removing the mixer pump from waste tank 49. Feed line 221 into the hydraulics of impeller assembly 55 flushes the liquid waste off of the upper shroud 135 of impeller 87 and around discharge nozzles 131 and 133 to clear any blockage. Purge feed lines 215,219 and 221 can also be used to deliver the initial flow of lubricant to radial and thrust bearing assemblies 89, 91, and 92 until the hydraulics of impeller assembly 55 pumps the process liquid up into motor cavity 151. The water supply in purge feed lines 215, 219, and 221 may be delivered at about a pressure of 80 psig for 100 gpm of water.

If mixer pump 47 is operated in an explosive environment, nitrogen gas can be delivered into column assembly 51. Referring to FIG. 7, upper closure plate 176 of cable tray assembly 171 supports a nitrogen supply connection 233 and a nitrogen exhaust connection 235. As is known in the art, pressurized nitrogen gas can be delivered into pipe 165 of column assembly 51 to resist the entry of flammable gases into pipe 165 containing power cable 173 and motor leads (not shown).

One of the major features of the present invention is to process the liquid waste in tank 49 and to use the head generated by the hydraulics of impeller assembly 55 to pump the processed liquid to both cool electric motor means 57 and to lubricate radial bearing assemblies 89 and 91 and thrust bearing assembly 92. As discussed hereinabove, the liquid waste contains highly radioactive materials containing 50% solids by volume, with particle sizes up to about 0.040 inches. FIG. 8 illustrates the internal flow path for the liquid waste. The liquid waste is suctioned up through suction adapter 113 where the mesh size of inlet screen 115 is such as to prevent the entry of particles which could damage or block the pump hydraulics. The impeller 87 operates to discharge the processed liquid out of discharge nozzles 131 and 133, as shown by the several arrows in FIG. 8, and to circulate the processed liquid through the bearing assemblies 89, 91 and 92 and then into electric motor means 57. The upper shroud 135 of impeller 87 acts as a cyclone separation in that it centrifuges the larger heavier particles outward with the mainstream liquid flow through the discharge nozzles 131 and 133. The smaller, lighter particles which spiral inwardly against the centrifugal spinning action of impeller 87 and into thrust bearing cavity 147 are either ground up in the annular gap formed by the two tungsten carbide rings 119 and 121 on the impeller hub 118 and lower end plate 111, respectively, or pass safely through electric motor means 57. The radial gap between rings 119 and 121 is, preferably, about 0.125 inches and acts to reduce the size of particles greater than 0.125 inches in diameter to less than the radial clearance between rotor can 71 and stator can 69, which may be about 0.150 inches, and to less than the dimensions of the axial slots 88 in the static bearing member of lower radial bearing assembly 91. Since the particles are reduced to less than 0.125 inches they can easily be passed with the liquid flow through the bearing surfaces of both thrust bearing assembly 92 and lower radial bearing assembly 91 and up into the radial clearance between stator can 69 and rotor can 71, or are further ground down by the hard-on-hard bearing surfaces of thrust bearing assembly 92 and lower radial bearing assembly 91, or are passed through the axial slots 88 of the static bearing member 85b on lower annular housing 95.

Still referring particularly to FIG. 8, after the processed liquid flows out of the radial clearance between stator can 69 and rotor can 71 it flows into the upper part of motor cavity 151 to cool the upper radial bearing assembly 89. The processed liquid then flows out of axial ports 243 and 245 in upper annular housing 93 and through radial port 247 in upper end plate 157, and exits out of housing assembly 53 for electric motor means 57 and into waste tank 49 of FIG. 3. The several arrows in FIG. 8 show this flow path for the processed liquid. The connection of upper end plate 157 to cap assembly 161 is such that no processed liquid enters into pipe 165 of column assembly 51.

Preferably, the several main components discussed above for mixer pump 47 are generally made of stainless steel and are generally welded together to form sealed joints to resist any undesirable liquid waste from entering into mixer pump 47 and to resist any undesirable processed liquid and/or fresh water from exiting mixer pump 47 and/or from entering the components of mixer pump 47 other than as discussed hereinabove. Contrary to prior art mixer pumps, mixer pump 47 is designed such that there is no leakage of fluids from the mixer pump 47 into the tank 49 which would add to the volume of radioactive liquid waste in the tank 49 which must be ultimately and properly disposed of in the manner discussed hereinabove.

Mixer pump 47 is designed to dispense the accumulation of sludge on the formation of aluminate crystals between close running surfaces during extended periods of inactivity. All running clearances are maximized to reduce the complete crystallization across the gap and to reduce the shear strength of any crystals that bridge the gaps. For example, the radial clearance in the annulus between stator can 69 and rotor can 71 is about 0.150 inches and the clearance between the upper shroud 135 of impeller 87 and lower end plate 111 is about 0.050 inches. Purge feed lines 215,219 and 221 are strategically located relative to upper radial bearing assembly 89, thrust bearing assembly 92, and impeller assembly 55, respectively, to clean out the sludge or aluminate crystals prior to operating mixer pump 47. Additionally, the starting torque of electric motor means 57 is such as to overcome the starting friction created by a shear strength of the sludge on aluminate crystals, which shear strength may be about 200 dynes/cm2.

Electric motor means 57 contains a high temperature insulation system which is capable of providing at least 40 years of continuous operating life at 200° C. Such insulation system may consist of mica, silicone and glass varnishes in various combinations and parts. This insulation system enables the "canned" motor mixer pump 47 to use the resident 90° C. process fluid for cooling electric motor means 57. Preliminary thermal analysis of the cooling of electric motor means 57 has indicated a maximum winding surface temperature for motor means 57 as being 190° C., with a resultant operating life being greater than 40 years. The insulation system of electric motor means 57 has been tested in radiation environments up to 1,000 megarads, which far exceeds the 300 megarads expected in the environment in which mixer pump 47 will generally be employed. Additionally, the power cables 173 may be coated with a radiation resistant material, such as asbestos, which resists radiation up to 1,000 megarads and which has a 40 year thermal life expectancy for temperatures at about 250°.

The structure and features of mixer pump 47 of FIGS. 3–10 contribute to give mixer pump 47 a minimum operating life in excess of about 5,000 hours over a 10-year period for a liquid waste temperature of 250°.

It will be appreciated that an improved mixer pump for a highly radioactive waste tank has been disclosed which positions a canned motor means in close proximity to an impeller assembly and uses the hydraulic head of the impeller to circulate liquid waste up into the canned motor to lubricate the bearings and to cool the canned motor means. It is to be further appreciated, that even though the mixer pump disclosed herein is used in a harsh, abrasive environment, that its expected operating life has been extended at least 50 times over prior art mixer pump designs.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A submersible motor mixer pump for mixing liquid waste containing particles inside a waste tank, comprising:
    a column assembly containing electrical power cable means and extending in said waste tank,
    a motor housing having electric motor means connected to said column assembly, said motor housing immersed in said liquid waste for positioning said electric motor means down into said waste tank,
    said electric motor means having a stator assembly and a rotor assembly spaced apart to form an annulus therebetween, said stator assembly having a stator can and said rotor assembly having a rotor can and a shaft rotatable therewith,
    an impeller assembly having an impeller which is connected to said shaft of said rotor assembly for mixing said liquid waste, and
    bearing means for mounting said electric motor means in said motor housing,
    said impeller of said impeller assembly including means being structured to create an hydraulic head when mixing said liquid waste and to force said liquid waste into said motor housing for lubricating and cooling said bearing means and for cooling said electric motor means.

2. A submersible motor mixer pump of claim 1, wherein said bearing means comprises hard-on-hard bearing surfaces structured to create a liquid film therebetween and wherein said bearing means being further structured to grind said particles prior to said liquid waste entering said annulus between said stator assembly and said rotor assembly for at least said cooling of said electric motor means.

3. A submersible motor mixer pump of claim 2, further comprising:
    a ring assembly being part of said impeller and said motor housing and containing hard-on-hard bearing surfaces which grind said particles in said liquid waste prior to said liquid waste flowing into said bearing means to resist damage to said bearing means.

4. A submersible motor mixer pump of claim 3, wherein said bearing means further includes radial and thrust bearing assemblies with said hard-on-hard surfaces, and wherein said hard-on-hard bearing surfaces of said bearing means and said hard-on-hard bearing surfaces of said ring assembly are made of tungsten carbide.

5. A submersible motor mixer pump of claim 4, wherein at least said radial bearing assemblies have bearing member means with slot means for receiving said solid particles for further grinding of said solid particles in said liquid waste.

6. A submersible motor mixer pump of claim 1, wherein said bearing means includes radial bearing assemblies associated with said shaft, and further comprising path means in said impeller means and said motor housing for circulating said liquid waste into said radial bearing assemblies and into said annulus between said stator assembly and said rotor assembly for said cooling of said electric motor means.

7. A submersible motor mixer pump of claim 6, further comprising first water supply means extending parallel to said column assembly and into said motor housing and said impeller assembly for delivering pressurized fresh water thereto to flush out said liquid waste therefrom.

8. A submersible motor mixer pump of claim 7, further comprising means between said motor housing and said column assembly having first channel means being part of said path means for directing said liquid waste out of said motor housing and second channel means for directing the flow of said pressurized water from said first water supply means into said motor housing and whereby said flow of said pressurized water and said liquid waste into said column assembly is resisted.

9. A submersible motor mixer pump of claim 7, wherein said impeller assembly further comprises:
    a casing for housing said impeller and connected to said motor housing,
    a suction adapter connected to said impeller and said casing for seating said impeller in said casing and for drawing said liquid waste into said impeller assembly,
    an inlet screen connected to said suction adapter, and
    a sparge ring located in said inlet screen, and
    wherein said submersible motor mixer pump further comprises second water supply means extending parallel to said column assembly for delivering pressurized fresh water to said sparge ring to flush out said liquid waste therefrom.

10. A submersible motor mixer pump of claim 1, wherein said column assembly has an elongated cavity, and further comprises a cable tray assembly having a closure plate closing off said cavity at a first end of said column assembly.

11. A submersible motor mixer pump of claim 10, wherein said cable tray assembly further comprises a plurality of spaced apart tray guides for supporting said electrical power cable means in said column assembly.

12. A submersible motor mixer pump for mixing liquid waste containing particles inside a waste tank, comprising:
    a column assembly containing electrical power cable means and extending in said waste tank,
    a motor housing having electric motor means connected to said column assembly for positioning said electric motor means down into said waste tank, said electric motor means having a stator assembly and a rotor assembly spaced apart to form an annulus therebetween, said stator assembly having a stator can and said rotor assembly having a rotor can and a shaft rotatable therewith, an impeller assembly having an impeller which is connected to said shaft of said rotor assembly for mixing said liquid waste, and bearing means for mounting said electric motor means in said motor housing, said impeller of said impeller assembly including means being structured to create an hydraulic head when mixing said liquid waste and to force said liquid waste into said motor housing for lubricating and cooling said bearing means and for cooling said elector motor means, said bearing means comprising hard-on-hard bearing surfaces structured to create a liquid film therebetween and wherein said bearing means being further structured to grind said particles prior to said liquid waste entering said annulus between said stator assembly and said rotor assembly for at least said cooling of said electric motor means.

13. A submersible motor mixer pump of claim 12, further comprising:

a ring assembly being part of said impeller and said motor housing and containing hard-on-hard bearing surfaces which grind said particles in said liquid waste prior to said liquid waste flowing into said bearing means to resist damage to said bearing means.

14. A submersible motor mixer pump of claim 13, wherein said bearing means further includes radial and thrust bearing assemblies with said hard-on-hard surfaces, and wherein said hard-on-hard bearing surfaces of said bearing means and said hard-on hard bearing surfaces of said ring assembly are made of tungsten carbide.

15. A submersible motor mixer pump of claim 14, wherein said bearing assemblies have bearing member means with slot means for receiving said solid particles for further grinding of said solid particles in said liquid waste.

\* \* \* \* \*